(12) United States Patent
Jariwala

(10) Patent No.: US 8,821,984 B2
(45) Date of Patent: Sep. 2, 2014

(54) COMPOSITION AND METHOD FOR IMPARTING INCREASED WATER REPELLENCY TO SUBSTRATES AND SUBSTRATES TREATED WITH SAME

(75) Inventor: Chetan P. Jariwala, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 649 days.

(21) Appl. No.: 12/209,547

(22) Filed: Sep. 12, 2008

(65) Prior Publication Data

US 2009/0074975 A1    Mar. 19, 2009

Related U.S. Application Data

(60) Provisional application No. 60/972,388, filed on Sep. 14, 2007.

(51) Int. Cl.
| | | |
|---|---|---|
| *B05D 3/00* | (2006.01) | |
| *B05D 5/00* | (2006.01) | |
| *D06M 13/236* | (2006.01) | |
| *C08G 18/28* | (2006.01) | |
| *B01F 17/00* | (2006.01) | |
| *D06M 15/59* | (2006.01) | |
| *D06M 13/265* | (2006.01) | |
| *C08G 18/09* | (2006.01) | |

(52) U.S. Cl.
CPC ......... *D06M 13/236* (2013.01); *C08G 18/2825* (2013.01); *B01F 17/0035* (2013.01); *D06M 15/59* (2013.01); *D06M 13/265* (2013.01); *D06M 2200/12* (2013.01); *C08G 18/095* (2013.01); *B01F 17/005* (2013.01)
USPC ...................................................... 427/393.4

(58) Field of Classification Search
CPC ........................................................ B05D 5/00
USPC ...................................................... 427/393.4
See application file for complete search history.

(56) References Cited

U.S. PATENT DOCUMENTS

| | | | | |
|---|---|---|---|---|
| 2,803,615 | A | * | 8/1957 | Brown et al. ............... 524/805 |
| 2,941,966 | A | | 6/1960 | Campbell |
| 2,941,983 | A | | 6/1960 | Smeltz |
| 2,941,988 | A | | 6/1960 | Wolf |
| 3,282,905 | A | | 11/1966 | Fasick et al. |
| 3,862,989 | A | | 1/1975 | Hansen |
| 3,896,251 | A | | 7/1975 | Landucci |
| 4,029,585 | A | | 6/1977 | Dettre |
| 4,148,844 | A | | 4/1979 | von Bonin et al. |
| 4,215,205 | A | * | 7/1980 | Landucci ................... 252/8.62 |
| 4,264,484 | A | | 4/1981 | Patel |
| 4,266,040 | A | | 5/1981 | Lin |
| 4,540,497 | A | | 9/1985 | Chang et al. |
| 5,276,175 | A | | 1/1994 | Dams et al. |
| 5,350,795 | A | * | 9/1994 | Smith et al. ................. 524/507 |
| 5,725,789 | A | | 3/1998 | Huber et al. |
| 5,817,249 | A | | 10/1998 | Audenaert et al. |
| 6,063,474 | A | * | 5/2000 | Raiford et al. ................. 428/98 |
| 6,204,342 | B1 | | 3/2001 | Nava |
| 6,262,180 | B1 | * | 7/2001 | Klun et al. ................... 525/199 |
| 6,411,285 | B1 | | 6/2002 | Miyazawa |
| 6,448,321 | B1 | * | 9/2002 | Tokita ........................... 524/394 |
| 6,664,354 | B2 | | 12/2003 | Savu et al. |
| 2003/0220462 | A1 | | 11/2003 | Porzio et al. |
| 2005/0171279 | A1 | * | 8/2005 | Cote et al. ..................... 524/871 |
| 2006/0094851 | A1 | * | 5/2006 | Audenaert et al. ............. 528/44 |
| 2006/0128867 | A1 | | 6/2006 | Marx et al. |

FOREIGN PATENT DOCUMENTS

| | | |
|---|---|---|
| JP | 59-115354 | 7/1984 |
| JP | H03-041160 | 2/1991 |
| JP | 2000-502382 | 2/2000 |
| WO | WO 97/22659 | 6/1997 |
| WO | WO 2006/052325 | 5/2006 |

OTHER PUBLICATIONS

Campbell et al., "Carbodiimides. IV. High Polymers Containing the Carbodiimide Repeat Unit", J. Org. Chem., (Aug. 1963), pp. 2069-2075, vol. 28.

Wagner et al., "α,ω-Diisocyanatocarbodiimides, -Polycarbodiimides, and Their Derivatives", Angewandte Chemie International Edition in English, (Oct. 1981), pp. 819-830, vol. 20, No. 10, Verlag Chemie GmbH, 6940 Weinheim.

Sandler et al.,"Organic Functional Group Preparations, Chapter 9, Carbodiimides", (1971), pp. 205-222, vol. II, Academic Press, New York.

Williams et al., "Carbodiimide Chemistry: Recent Advances", Chem. Rev., (1981), pp. 589-636, vol. 81, American Chemical Society.

AATCC Test Method 22/1996, AATCC Technical Manual, (2001), pp. 63-65, vol. 76, American Association of Textile Chemists and Colorists.

Extended European Search Report for Application No. 08830179.1, dated Feb. 24, 2014, 3 pages.

* cited by examiner

*Primary Examiner* — Michael Cleveland
*Assistant Examiner* — James M Mellott
(74) *Attorney, Agent, or Firm* — Robert W. Sprague

(57) ABSTRACT

A treatment composition for imparting water repellency to articles comprising a blend of one or more fluorochemical esters and one or more polycarbodiimides, a method for treating articles with such composition, and the articles produced thereby. The treatment composition and method are especially well suited for use by consumers on personal articles such as garments.

14 Claims, No Drawings

COMPOSITION AND METHOD FOR IMPARTING INCREASED WATER REPELLENCY TO SUBSTRATES AND SUBSTRATES TREATED WITH SAME

PRIORITY CLAIM

This application claims the benefit of U.S. Provisional Application No. 60/972,388, filed Sep. 14, 2007.

FIELD OF THE INVENTION

The present invention relates to compositions and methods suitable for application to substrates to increase the water repellency thereof. It is particularly suitable for use on fabric substrates and garments.

BACKGROUND

Many articles such as garments, book bags, etc. are treated with water repellent coatings applied to the fabric before the finished article is fabricated. Such coatings are typically applied using processes that encompass high temperature and other industrial techniques. After washing and/or use, the original water repellency properties are typically reduced.

In order to improve or restore water repellency properties, there are several known commercial products intended to be applied by consumers, i.e., using simple spraying of the product on the garment followed by drying in home clothing dryers, etc. Examples of commercial products include REVIVEX® Water Repellent for Outerwear and GRANGER G-LINE® Water Proofing.

The continued need exists, however, for improved treatment compositions that can be easily applied to articles by consumers to impart desired water repellency performance, and easier methods of applying such compositions to achieve effective water repellency.

SUMMARY OF INVENTION

The present invention provides compositions and methods for treating substrates such as fabrics or garments to increase the water repellency performance thereof. The invention also provides articles such as fabrics or garments treated with such compositions and methods.

In brief summary, treatment compositions of the invention are an emulsion of a blend of (A) one or more fluorochemical esters and (B) one or more polydicarbodiimides.

Briefly summarizing, methods of the invention comprise (1) applying to a portion of the surface of the article to be treated a treatment composition as described below and (2) drying the treatment composition.

Compositions of the invention can be used to impart increased water repellency to a variety of articles including, e.g., fabrics such as are used in personal articles, garments, etc. synthetic fabrics, natural fabrics, and blends. Compositions of the invention may be applied to fabric substrates which have been treated with fluorochemical materials and those which have not. The compositions of the invention are easy to apply and well suited for use by consumers. They can be used to rejuvenate the water repellent performance of articles such as garments which were previously treated with water repellent agents and which have undergone a degradation in performance due to washing, aging, and use, and can also be applied untreated articles which have not been previously treated with water repellent materials.

DETAILED DESCRIPTION OF ILLUSTRATIVE EMBODIMENTS

The present invention provides treatment compositions, methods of applying such compositions, and articles produced by such methods.

As summarized above, treatment compositions of the invention are aqueous emulsions of a blend of (A) one or more fluorochemical esters and (B) one or more polydicarbodiimides.

The (A) and (B) components are typically used in a weight ratio of about 27:75 to about 75:25 with a weight ratio of about 60 parts by weight of (A) to 40 parts by weight of (B) typically being preferred.

The treatment composition is aqueous and preferably comprises from about 0.5 to about 2.5 parts by weight solids (i.e., actives in (A) and (B)) per 100 parts by weight of the total treatment composition.

Component (A)—Fluorochemical Esters

Treatment compositions of the invention comprise one or more fluorochemical esters. In typical embodiments, the fluorochemical ester is of the formula:

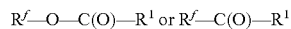

$$R^f\text{—O—C(O)—}R^1 \text{ or } R^f\text{—C(O)—}R^1$$

wherein $R^f$ is selected from the group consisting of: (1) $F(CF_2)_x(CH_2)_m$ wherein x is from about 4 to about 20 and m is from about 0 to about 6; and (2) $F(CF_2)_xSO_2N(R^2)R^3$ wherein x is a positive integer from about 4 to about 20, $R^2$ is an alkyl radical of from about 1 to about 4 carbon atom, and $R^3$ is an alkylene radical of from about 1 to about 12 carbon atoms; and $R^1$ is an aliphatic hydrocarbon having from about 12 to about 76 carbon atoms.

The fluoroalkyl portion of the alternative $R^f$ structure is a fluorinated, preferably saturated, monovalent, non-aromatic, aliphatic radical of at least three fully fluorinated connected carbon atoms in a chain. The chain in the radical is straight, branched, or, if sufficiently large, cyclic and is optionally interrupted by divalent oxygen atoms, hexavalent sulfur atoms, or trivalent nitrogen atoms bonded only to carbon atoms. A fully fluorinated aliphatic radical is preferred, but hydrogen or chlorine atoms are optionally present as substituents in the radical provided that not more than one atom of either is present in the radical for every two carbon atoms. If desired treatment compositions of the invention can be substantially free of such compounds as perfluoro octanoic acid and perfluoro octane sulfonic acid.

$R^1$ is an aliphatic hydrocarbon with a carbon chain length of about 12 to about 76 carbons, preferably from about 24 to about 50 carbons. Alcohols corresponding to $R^1OH$ are commercially available from Baker Petrolite Corporation under the trademark UNILIN. UNILIN™ alcohols are fully saturated long chain linear alcohols. The average chain lengths for UNILIN™ 350, 425, 550 and 700 are about 24, 32, 40, and 48, respectively. Acids corresponding to $R^1COOH$ are commercially available from Baker Petrolite Corporation under the trademark UNICID. The range of average chain lengths for UNICID™ 350, 425, 550, and 700 are 24-29, 29-37, 37-45, and 40-48, respectively. In one preferred embodiment, the fluorochemical ester is of the formula:

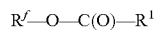

$$R^f\text{—O—C(O)—}R^1$$

wherein $R^f$ comprises $C_4F_9SO_2N(CH_3)CH_2CH_2$— and $R^1$ is an alkyl containing 24 to 28 carbon atoms.

There are various methods by which the above compounds can be prepared, and the inventive process is not limited to a particular method of preparation. For example, the above compounds are conveniently made by reacting an appropriate fatty alcohol with the appropriate fluorocarbon acid to form an acid ester, or by reacting an appropriate fatty acid with the appropriate fluorocarbon alcohol. Other compounds in these groups are readily made by those skilled in the art by following similar processes.

Such fluorochemical esters have been disclosed in U.S. Pat. No. 6,063,474 (Raiford et al.) where they were used as polymer melt additives, i.e., were incorporated into a polymeric material, to impart repellency properties thereto. In the present invention, the esters are one component of a treatment composition applied topically.

Component (B)—Polycarbodiimides

Treatment compositions of the invention comprise one or more polycarbodiimides. In typical embodiments, the polycarbodiimide is derived from a carbodiimidization reaction of at least one oligomer having at least one isocyanate group and comprising at least two repeating units deriving from one or more ethylenically unsaturated monomers.

In typical embodiments, the polycarbodiimide is represented by the formula:

$$Q^1X^1CONH(A^1(N{=}C{=}N)_q)_mA^2NHCOX^2Q^2$$

wherein $X^1$ and $X^2$ each independently represents O, S, or NH, $A^1$, and $A^2$ each independently represents the residue of an organic di- or triisocyanate compound obtained by removing the isocyanate groups therefrom, q is 1 or 2, m has a value of 1 to 20, and $Q^1$ and $Q^2$ are independently selected from a hydrocarbon group that may contain one or more catenary or non-catenary hetero-atoms, a partially or fully fluorinated hydrocarbon group that may contain one or more catenary or non-catenary hetero-atoms and functional groups corresponding to any of the following formulas:

$$G^3M_hL^2- \quad (A)$$

$$Q^3X^3OCNHA^4((N{=}C{=}N)_tA^3)_sNHCOX^4L^3M_hG^4 \quad (B)$$

$$Q^3X^3OCNHA^4((N{=}C{=}N)_tA^3)_sNHCOX^4L^4- \quad (C)$$

$$G^4M_hL^2X^3OCNHA^4((N{=}C{=}N)_tA^3)_sNHCOX^4L^4- \quad (D)$$

$$G^4M_hL^2X^3OCNHA^4((N{=}C{=}N)_tA^3)_sNHCOX^4L^3M_hG^4 \quad (E)$$

wherein $G^3$ and $G^4$ each independently represents an end group, $M_h$ represents two or more repeating units deriving from one or more ethylenically unsaturated monomers, $L^2$ represents an organic divalent linking group, $Q^3$ represents a hydrocarbon group that may contain one or more catenary or non-catenary hetero-atoms or a partially or fully fluorinated hydrocarbon group that may contain one or more catenary or non-catenary hetero-atoms, $A^3$ and $A^4$ each independently represents the residue of an organic di- or triisocyanate compound obtained by removing the isocyanate groups therefrom, $X^3$ and $X^4$ each independently represents O, S, or NH, s has a value of 1 to 20, and t is 1 or 2, $L^3$ represents an organic trivalent linking group, and $L^4$ represents a hydrocarbon group that may optionally contain one or more catenary or non-catenary hetero-atoms or a partially or fully fluorinated hydrocarbon group that may contain one or more catenary or non-catenary hetero-atoms; and wherein at least one $Q^1$ and $Q^2$ corresponds to a group of formula (A), (B), (D), or (E).

According to a particular embodiment, the carbodiimide compound or mixture of carbodiimide compounds of the present invention can be prepared in a three step reaction although it will generally not be required to separate reaction products after the individual steps, i.e., the reaction may be carried out in three steps in a single reactor. In a first step, a functionalized oligomer having at least two repeating units, is prepared which, in a second step, is reacted to form an oligomer having at least one isocyanate group. In a third step said oligomer is further reacted to form a carbodiimide. With the term 'functionalized oligomer' is meant that an oligomer is prepared that contains a functional group capable of reacting with an isocyanate.

In a first step, a functionalized oligomer having at least two repeating units can be prepared by free radical oligomerization of one or more ethylenically unsaturated monomers, typically non-fluorinated ethylenically unsaturated monomers. Examples of ethylenically unsaturated monomers include those represented by the general formula:

$$R^hC(R){=}CR^2$$

wherein $R^h$ represents H, Cl, or a hydrocarbon group that may contain one or more catenary (i.e., in-chain, bonded only to carbon) or non-catenary hetero-atoms and wherein each R being the same or different represents H, a lower alkyl of 1 to 4 carbon atoms, Cl, or Br. The term "hydrocarbon group" as used herein, means any substantially fluorine-free organic moiety that contains hydrogen and carbon, and optionally, one or more substituents.

Suitable ethylenically unsaturated monomers are known and are generally commercially available. Examples of such compounds include the general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether;

unsaturated acids such as acrylic acid, methacrylic acid, alpha-chloro acrylic acid, crotonic acid, maleic acid, fumaric acid, itaconic acid and their anhydrides and esters such as vinyl, allyl, methyl, butyl, isobutyl, hexyl, heptyl, 2-ethyl-hexyl, cyclohexyl, lauryl, stearyl, isobornyl, octadecyl, hexadecyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha, beta-unsaturated carboxylic acid derivatives such as allyl alcohol, allyl glycolate, acrylamide, methacrylamide, n-diisopropyl acrylamide, diacetoacrylamide, N,N-diethylaminoethylmethacrylate, N-t-butylamino ethyl methacrylate; styrene and its derivatives such as vinyl toluene, alpha-methylstyrene, alpha-cyanomethyl styrene; lower olefinic hydrocarbons which contain halogen such as ethylene, propylene, isobutene, 3-chloro-1-isobutene, isoprene, and allyl or vinyl halides such as vinyl and vinylidene chloride. Other useful monomers include monomers that contain a urethane group, such as the reaction product of 2-hydroxy-ethyl(meth)acrylate with a monofunctional isocyanate, such as octadecyl isocyanate. Particular suitable monomers include those selected from the group consisting of octadecyl(meth)acrylate, hexadecyl(meth)acrylate, methylmethacrylate, butyl (meth)acrylate, isobutyl(meth)acrylate and isobornyl(meth) acrylate, ethylhexyl methacrylate, urethane containing (meth)acrylate as described above, and mixtures thereof.

The free radical oligomerization is typically carried out in the presence of mono- or difunctional hydroxy- or amino-functionalized chain transfer agents, in order to prepare mono- or difunctionalized oligomers respectively. Examples of mono functional chain transfer agents include those selected from 2-mercaptoethanol, 3-mercapto-2-butanol, 3-mercapto-2-propanol, 3-mercapto-1-propanol and 2-mercapto-ethylamine. A particularly suitable monofunctional chain transfer agent is 2-mercaptoethanol. Examples of difunctional chain transfer agents include those having two hydroxyl or amino groups or a hydroxy and amino group. A particular suitable example of a difunctional chain transfer agent is 3-mercapto-1,2-propanediol.

The functionalized oligomer should generally comprise a sufficient number of repeating units to render the portion oligomeric. The oligomer suitably comprises from 2 to 40, in particular from 2 to 20 repeating units derived from one or more ethylenically unsaturated monomers. According to a particular embodiment, the oligomer has 3 to 15 repeating units. According to another embodiment, the oligomer has between 4 and 15 repeating units.

In order to prepare the functionalized oligomer, a free-radical initiator may be used to initiate the oligomerization. Free-radical initiators include those known in the art and include in particular azo compounds, such as 2,2'-azobisisobutyronitrile (AIBN) and 2,2'-azobis(2-cyanopentane) and the like, hydroperoxides such as cumene, t-butyl, and t-amylhydroperoxide, peroxyesters such as t-butylperbenzoate and di-t-butylperoxyphtalate, diacylperoxides such as benzoyl peroxide and lauroyl peroxide.

The oligomerization reaction can be carried out in any solvent suitable for organic free-radical reactions. Particularly suitable solvents are solvents that do not interfere with the isocyanate reactions in the second and the third step to form the carbodiimide. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), ethers (e.g., diethylether, glyme, diglyme, diisopropyl ether), esters (e.g., ethyl acetate, butyl acetate), ketones (e.g., acetone, methylethyl ketone, methyl isobutyl ketone) and mixtures thereof.

The oligomerization reaction can be carried out at any temperature suitable for conducting a free-radical oligomerization reaction. Particular temperature and solvents for use can be easily selected by those skilled in the art based on considerations such as the solubility of reagents, the temperature required for the use of a particular initiator, molecular weight desired and the like. While it is not practical to enumerate a particular temperature suitable for all initiators and all solvents, generally suitable temperatures are between about 30° C. and about 150° C.

In a second step, an oligomer having at least one isocyanate group is prepared by a condensation reaction of the functionalized oligomer with an excess of a polyisocyanate, i.e., a di- or triisocyanate. Generally, the second reaction step is also conducted in the presence of one or more further isocyanate reactive compounds. Such further isocyanate reactive compounds are typically compounds containing one or two isocyanate-reactive groups and include mono- and difunctional alcohols, thiols and amines. The further isocyanate reactive compounds are generally non-fluorinated but can be partially or fully fluorinated as well. A single compound or a mixture of different compounds may be used. Examples include alcanols, such as methanol, ethanol, n-propylalcohol, isopropyl alcohol, n-butyl alcohol, isobutyl alcohol, t-butyl alcohol, n-amyl alcohol, t-amyl alcohol, 2-ethylhexanol, glycidol, (iso)stearyl alcohol, behenyl alcohol, branched long chain alkanols, such as Guerbet alcohols (2-alkyl alkanols having $C_{14}$ to $C_{24}$ alkyl chains, available from Henkel), alcohols comprising poly (oyalkylene) groups, such as, e.g., methyl or ethyl ether of polyethyleneglycol, hydroxyl-terminated methyl or ethyl ether of random or block copolymer of ethyleneoxide and/or propyleneoxide and polysiloxane group containing alcohols. Further examples include diols, such as 1,4-butanediol, 1,6-hexanediol, 1-10-decanediol, 4,4'-isopropylidene diphenol (Bisphenol A); polyester diols, such as polycaprolactone diol, fatty acid dimer diols and poly(oxy)alkylenediols with an oxyalkylene group having 2 to 4 carbon atoms, such as —$OCH_2CH_2$—, —$O(CH_2)_4$—, —$OCH_2CH_2CH_2$—, —$OCH(CH_3)CH_2$—, and —$OCH(CH_3)CH(CH_3)$— (preferably the oxyalkylene units in said poly(oxyalkylene) being the same, as in polypropyleneglycol or present as a mixture), ester diols, such as glycerolmonostearate and polysiloxane group containing diols. Further suitable isocyanate reactive compounds include amino group containing compounds, such as amino-terminated polyethyleneoxide or propyleneoxide or copolymers thereof, amino-terminated methyl or ethylethers of polyethyleneoxide or polypropyleneoxide or copolymers thereof and amino group terminated polysiloxanes. Fluorinated isocyanate reactive compounds that may be used include for example partially fluorinated or perfluorinated polyethers that have one or two isocyanate reactive groups such as hydroxyl groups, amino groups and thiol groups. Still further, a fluorinated isocyanate reactive compound that can be used is a partially or fully fluorinated aliphatic compound having one or two isocyanate reactive groups such as hydroxyl groups, amino groups and thiol groups. Examples of the latter include perfluorinated aliphatic mono-alcohols having 3, 4, or up to 14 carbon atoms. Still further suitable isocyanate reactive compounds include thiol group containing compounds, such as 1,4-butanedithiol, 1,6-hexanedithiol.

Particularly suitable further isocyanate reactive compounds include monofunctional alcohols, such as (iso)stearylalcohol and $C_{18}$ 2-alkyl alkanols; ester diols, such as glycerol monostearate, amino- or hydroxy group containing polysiloxanes and mixtures thereof.

The isocyanate reactive compounds may be used alone or in combination. The isocyanate reactive compound can be present up to about 50 mole % based on the total amount of isocyanate functionalities.

Polyisocyanates for use in accordance with the present invention include aliphatic and aromatic di- and triisocyanates. Examples of diisocyanates include 4,4'-methylenediphenylenediisocyanate (MDI), 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,4'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate, alicyclic diisocyanates such as 3-isocyanatomethyl-3,5,5-trimethylcyclohexylisocyanate, 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate, and cyclic diisocyanates such as isophorone diisocyanate (IPDI) and dicyclohexylmethane-4,4'-diisocyanate. Examples of triisocyanates include aliphatic triisocyanates such as 1,3,6-hexamethylenetriisocyanate and aromatic triisocyanates such as polymethylenpolyphenylisocyanate (PAPI, VORANATE™), DESMODUR™R (tri-(4-isocyanatophenyl)-methane, available from Bayer) and DESMODUR™ L (available from Bayer). Also useful are isocyanates containing internal isocyanate derived moieties such as biuret-containing triisocyanates such as that available from Bayer as DESMODUR™ N-100 and isocyanurate-containing triisocyanates such as that available from Huls AG, Germany, as IPDI-1890 and DESMODUR N-3300, available from Bayer. Particular suitable polyisocyanates include aromatic polyisocyanates such as MDI and 2,4-toluenediisocyanate and aliphatic polyisocyanates, such as hexamethylene diisocyanate, DESMODUR™ N, DESMODUR™ W and DESMODUR™ N-3300.

The oligomer having at least one isocyanate group can be prepared by a condensation reaction, carried out under conventional conditions well-known to those skilled in the art. The condensation reaction is preferably carried out under dry conditions in a polar solvent such as ethyl acetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are between about room temperature and about 120° C.

In a particular embodiment of the present invention, the oligomer having at least one isocyanate group may be represented by formula:

$$G^1M^hG^2$$

wherein $M^h$ represents two or more repeating units deriving from one or more ethylenically unsaturated monomers, $G^1$ and $G^2$ each independently represents an end group and wherein at least one of the end groups comprises an isocyanate group. In one embodiment of the invention, one of the end groups is free of isocyanate groups and the other group comprises one or two isocyanate groups. In a particular embodiment, one of the end groups is free of isocyanate groups and the other group comprises a group of the formula:

$$-L^1CONHZNCO$$

wherein $L^1$ represents O or NH and Z represents an aliphatic or aromatic group.

In a third step, the carbodiimide compound or mixture of carbodiimide compounds can be formed by a condensation reaction of the oligomers having at least one isocyanate group in the presence of suitable catalysts as described, for example by K Wagner et al., Angew. Chem. Int. Ed. Engl., vol. 20, p 819-830 (1981); by S. R. Sandler et al., Org. Functional Group Prep., vol. 2, p 205-222 (1971) and by A Williams et al., Chem. Rev., vol. 81, p 589-636 (1981). The preparation of urethane containing or urethane terminated polycarbodiimides has been described in, e.g., U.S. Pat. No. 2,941,983 and by T. W. Campbell et al. in J. Org. Chem., 28, 2069 (1963). Representative examples of suitable catalysts are described in, e.g., U.S. Pat. Nos. 2,941,988, 3,862,989, and 3,896,251. Examples include 1-ethyl-3-pholine, 1-ethyl-3-methyl-3-pholine-1-oxide, 1-ethyl-3-methyl-3-pholine-1-sulfide, 1-ethyl-3-methyl-pholidine, 1-ethyl-3-methyl-pholidine-1-oxide, 3-methyl-1-phenyl-3-pholine-1-oxide, bicyclic terpene alkyl or hydrocarbyl aryl phosphine oxide, or camphene phenyl phosphine oxide.

The particular amount of catalyst used will depend to a large extent on the reactivity of the catalyst itself and the organic polyisocyanate being used. A concentration range of about 0.05 to about 5 parts of catalyst per 100 parts of oligomer having at least one isocyanate group is generally suitable. The carbodiimidization reaction may involve further isocyanate compounds other than the isocyanate containing oligomer. Such further isocyanate compounds include mono-isocyanates as well as polyisocyanates such as those described above.

In a particular embodiment according to the present invention the carbodiimide compound can be represented by the formula:

$$Q^1X^1CONH(A^1(N=C=N)_q)_mA^2NHCOX^2Q^2$$

wherein $X^1$ and $X^2$ each independently represents O, S, or NH, $A^1$ and $A^2$ each independently represents the residue of an organic di- or triisocyanate compound obtained by removing the isocyanate groups therefrom, q is 1 or 2, m has a value of 1 to 20, and $Q^1$ and $Q^2$ are independently selected from a hydrocarbon group that may contain one or more catenary or non-catenary hetero-atoms, a partially or fully fluorinated hydrocarbon group that may contain one or more catenary or non-catenary hetero-atoms and functional groups corresponding to any of the following formulas:

$$G^3M_hL^2- \tag{A}$$

$$Q^3X^3OCNHA^4((N=C=N)_tA^3)_sNHCOX^4L^3M_hG^4 \tag{B}$$

$$Q^3X^3OCNHA^4((N=C=N)_tA^3)_sNHCOX^4L^4- \tag{C}$$

$$G^4M_hL^2X^3OCNHA^4((N=C=N)_tA^3)_sNHCOX^4L^4- \tag{D}$$

$$G^4M_hL^2X^3OCNHA^4((N=C=N)_tA^3)_sNHCOX^4L^3M_hG^4 \tag{E}$$

wherein $G^3$ and $G^4$ each independently represents an end group, $M_h$ represents two or more repeating units deriving from one or more ethylenically unsaturated monomers, $L^2$ represents an organic divalent linking group, $Q^3$ represents a hydrocarbon group that may contain one or more catenary or non-catenary hetero-atoms or a partially or fully fluorinated hydrocarbon group that may contain one or more catenary or non-catenary hetero-atoms, $A^3$ and $A^4$ each independently represents the residue of an organic di- or triisocyanate compound obtained by removing the isocyanate groups therefrom, $X^3$ and $X^4$ each independently represents O, S, or NH, s has a value from 1 to 20 and t is 1 or 2, $L^3$ represents an organic trivalent linking group and $L^4$ represents hydrocarbon group that may optionally contain one or more catenary or non-catenary hetero-atoms or a partially or fully fluorinated hydrocarbon group that may contain one or more catenary or non-catenary hetero-atoms; and wherein at least one of $Q^1$ and $Q^2$ corresponds to a group of formula (A), (B), (D), or (E).

The groups $A^1$, $A^2$, $A^3$ and $A^4$ (hereinafter collectively referred to as "A-groups") each independently represent the residue of an organic di- or triisocyanate compound obtained by removing the isocyanate groups therefrom. The A-groups may be the same or different. When A is trivalent, derived from triisocyanates, branched or crosslinked polycarbodiimides can result. Different A-groups may be used together to give slight branching in order to modify properties. Substituents may be present in A provided they contain no isocyanate-reactive hydrogen atoms. Particularly suitable groups A are unsubstituted organic linking groups, such as, e.g.,

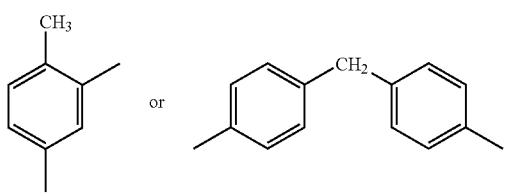

The endgroups $G^3$ and $G^4$ typically represent hydrogen or the residue of the initiator used to prepare the functionalized oligomer.

The linking groups $L^2$ and $L^3$ respectively represent an organic divalent or trivalent linking group. Examples thereof include divalent or trivalent aliphatic including linear branched or cyclic aliphatic groups or aromatic groups. The linking groups $L^2$ and $L^3$ generally comprise from 1 to 30 carbon atoms, for example, from 2 to 12 carbon atoms.

The terminal group $Q^3$ represents a hydrocarbon group, optionally partially or fully fluorinated, that may contain one or more catenary or non-catenary hetero-atoms. $Q^3$ generally has from 1 to 50 carbon atoms. The terminal group $Q^3$ may for example represent the residue of a monofunctional isocyanate reactive compound, for example of an isocyanate reactive compound as described above, obtained by removal of the isocyanate reactive group. Examples for $Q^3$ include monovalent aliphatic including linear branched or cyclic aliphatic groups or aromatic groups, a partially or fully fluorinated aliphatic group or a partially or fully fluorinated polyether group. Particular useful examples for end groups $Q^3$ include linear or branched aliphatic terminal moieties of at least 8 carbon atoms.

Linking group $L^4$ represents an aromatic or aliphatic hydrocarbon group that may optionally contain one or more caternary or non-catenary hetero-atoms. The linking group $L^4$ may for example represent the residue of a difunctional isocyanate reactive compound, for example as described above, obtained after removing the isocyanate reactive groups therefrom. Examples thereof include divalent aliphatic groups including linear branched or cyclic aliphatic groups or aromatic groups as well as partially or fully fluorinated aliphatic groups. The aliphatic groups may contain one or more caternary or non-catenary heteroatoms such as oxygen and nitrogen. Particular suitable examples of $L^4$ include:

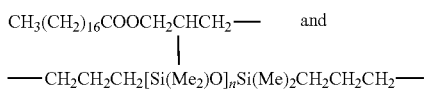

It will further be appreciated by one skilled in the art that the preparation of the carbodiimide results in a mixture of compounds and accordingly, general formula (III) should be understood as representing a mixture of compounds whereby the indices q, m, t and s in formula (III) represent the molar amount of the corresponding unit in such mixture.

Such polycarbodiimides have been known for use in compositions for imparting repellency to substrates as disclosed in U.S. Patent Publication No. 2006/0094851 (Audenaert et al.).

Additives

In addition to the (A) and (B) discussed above, compositions of the invention may further comprise other suitable components as desired. For example, in some embodiments they will further comprise a co-solvent, e.g., an alcohol component, e.g., to improve the freeze/thaw properties of the composition making it easier to store, ship, and handle, improve compatibility with other components, etc. Illustrative examples include isopropanol, butoxyethanol, propylene glycol, dipropylene glycol methyl ether, etc. and combinations thereof.

Other additives may be incorporated in accordance with the invention as desired. For example, effective amounts of wetting agents, e.g., from about 0.001 to about 1 wt % can be incorporated in the formulation if desired to improve the wetting characteristics of the treatment composition as it is applied to fabric. Illustrative examples of suitable wetting agents include fluorochemical surfactants and nonionic surfactants, for example, FIBROSIL™ STS, a silicone based polyether available from Fibro Chem. Inc. of Dalton, Ga.

In some embodiments, the treatment composition will be fragrance free. In others a fragrance may be added if desired.

Method

As briefly summarized above, the invention of the method comprises (1) applying to a portion of the surface of an article a treatment composition as described above and (2) drying the treatment composition on the surface of the article.

The treatment composition can be applied via any suitable means. Illustrative examples include spraying such as with handheld pumps or aerosol devices. Before application, the treatment composition is preferably shaken or stirred well. The substrate being treated, e.g., a fabric article such as a used garment, is preferably clean and may be wet, damp, or dry as desired. The treatment composition is applied to the portions of the substrate being treated, typically preferably substantially uniformly, in sufficient quantity that the surface to which it has been applied looks moist or damp. In the case of garments, it typically preferred to apply treatment composition more liberally to shoulder and cuff areas. An advantage of the invention is that the treatment composition can be applied easily and is color fast for most materials.

Typically, the treatment will have little or no effect upon the hand of the fabric substrate or article being treated though in some cases fabric articles have been observed to be softer following treatment.

The coating compositions of the present invention can be applied to a wide variety of substrates, including, but not limited to, fibrous substrates, leather substrates, and hard substrates. It is particularly well suited for use on fibrous substrates. Illustrative examples of fibrous substrates include woven, knit, and nonwoven fabrics (e.g., of natural, synthetic, and natural/synthetic blends including, for example, cotton, linen, wool, silk, polyester, nylon, and blends of such fibers), laminates (e.g., nylon or polyester fabric bonded to expanded polytetrafluoroethylene ("PTFE") such as are used in GORE™ membranes), textiles, carpets, and paper.

The drying step is carried out via conventional means. In one illustrative embodiment, following application of the treatment composition, the article to which it has been applied is placed in a conventional home laundry clothing dryer and tumble dried for about 45 to 60 minutes at low to medium heat setting, e.g., about 50° C. to 85° C. In another illustrative embodiment, following application of the treatment composition, the article to which it has been applied is ironed with a hand iron, with or without steam, at a temperature setting of about 140° C. to 150° C.

Examples

The invention will be further explained with the following illustrative examples.

Test Methods

Spray Rating ("SR"):

The spray rating of a treated substrate is a value indicative of the dynamic repellency of the treated substrate to water that impinges on the treated substrate. The repellency was measured by Test Method 22-1996, published in the 2001 Technical Manual of the American Association of Textile Chemists and Colorists (AATCC), and was expressed in terms of a 'spray rating' of the tested substrate. The spray rating was obtained by spraying 250 ml water on the substrate from a height of 15 cm. The wetting pattern was visually rated using a 0 to 100 scale, where 0 means complete wetting and 100 means no wetting at all.

Bundesmann Test:

The impregnating effect of rain on treated substrates was determined using the Bundesmann Test Method (DIN 53888). In this test, the treated substrates were subjected to a simulated rainfall, while the back of the substrate was being rubbed. The appearance of the upper exposed surface was checked visually after 1, 5, and 10 minutes and was given a rating between 1 (complete surface wetting) and 5 (no water remains on the surface). Besides the observation of the wetting pattern, also the water absorption (% abs) was measured. Well-treated samples gave low absorption results.

Water Repellency Test ("WR"):

The water repellency of a substrate was measured using a series of water-isopropyl alcohol test liquids and was expressed in terms of the "WR" rating of the treated substrate. The WR rating corresponded to the most penetrating test liquid which did not penetrate or wet the substrate surface after 15 seconds exposure. Substrates which were penetrated by or were resistant only to 100% water (0% isopropyl alcohol), the least penetrating test liquid, were given a rating of 0, whereas substrates resistant to 100% isopropyl alcohol (0% water), the most penetrating test liquid, were given a rating of 10. Other intermediate ratings were calculated by dividing the percent isopropyl alcohol in the test liquid by 10, e.g., a treated substrate resistant to a 70%/30% isopropyl alcohol/water blend, but not to an 80%/20% blend, would be given a rating of 7.

Test Treatment Compositions

Treatment compositions were prepared as follows.

Preparation of Component A

For Examples 1-4, an emulsion of a fluorochemical ester (referred to herein as "Component A") were prepared by reacting the indicated hydrocarbon acid with the indicated alcohol as described in U.S. Pat. No. 6,063,474 (Raiford et al.). That reference is incorporated herein in its entirety by reference. In Examples 1-3, i.e., Components A1-A3, MeFBSE ($C_4F_9SO_2N(CH_3)CH_2CH_2OH$) was used; it can be made as disclosed in U.S. Pat. No. 6,664,354 (Savu et al.) which is incorporated herein by reference in its entirety. In Example 4, i.e., Component A4, FLUOWET™ EA 800 perfluoralkyl alcohol from Clariant Corporation was used.

In Comparative Example C1, component A5 was prepared according to the same process using UNICID™ 550 and stearyl alcohol from Aldrich Chemical Co. Milwakee, Wis.

To make Component A1, an emulsion of UNICID™ 350-MeFBSE, the following procedure was followed.

A round bottom flask was charged with 100 g UNICID™ 350-MeFBSE, 130 g methyl isobutyl ketone, 20 g heptane, 1 g UNITHOX™ 480 Surfactant, and 2.5 g SURFYNOL™ 502 Wetting Agent (80% solids). This mixture was allowed to heat to 80° C. (175° F.). The mixture was kept at 80° C. for one hour for all the components to be completely dissolved.

In a separate container, 450 g deionized water and 14 g ARQUAD™ 12-50 Surfactant were heated to 80° C. and allowed to agitate for 15 minutes to prepare a water phase. While stirring the organic phase the water phase was slowly added to the round bottom flask at 80° C. This premix was allowed to agitate for 1 hour at 80° C. This premix was passed through a microfluidizer. The first pass out of the microfluidizer was kept at 65° C. until the rest of the batch passed through the microfluidizer. This emulsion was again passed through the microfluidizer for a second time at 65° C. This emulsion was added back to the round bottom flask and stripped of solvents (i.e., the MIBK and heptane) under vacuum at a temperature from between about 30° C. and about 40° C. An emulsion with a particle size of about 115 nm and % solids of about 30 resulted.

Components A2-A5 were prepared as follows.

A round bottom flask was charged with 10 g of the indicated ester and 20 g methyl isobutyl ketone. This mixture was allowed to heat to 80° C. (175° F.). The mixture was kept at 80° C. for one hour for all the components to be completely dissolved.

In a separate container 50 g of deionized water and 0.5 g of ARQUAD™ 12-50 Surfactant were heated to 80° C. and allowed to agitate for 15 minutes to prepare a water phase. While stirring the organic phase the water phase was slowly added to the round bottom flask at 80° C. This premix was allowed to agitate for 1 hour at 80° C. This premix was passed through a microfluidizer. The first pass out of the microfluidizer was kept at 65° C. until the rest of the batch passed through the microfluidizer. This emulsion was again passed through the microfluidizer for a second time at 65° C. This emulsion was added back to the round bottom flask and stripped of solvents (i.e., the MIBK and heptane) under vacuum at a temperature from between about 30° C. and about 40° C. An emulsion with % solids of about 30 resulted.

The ester components used in the treatment compositions illustrated in the examples were as follows:

| Example | Component A | Esters |
|---------|-------------|--------|
| 1 | A1 | UNICID ™ 350-MeFBSE |
| 2 | A2 | UNICID ™ 425-MeFBSE |
| 3 | A3 | UNICID ™ 550-MeFBSE |
| 4 | A4 | UNICID ™ 350-$C_8F_{17}$ |
| C1 | A5 | UNICID ™ 550-Stearate |

Preparation of Component B

In each of Examples 1-4 and Comparative Example C1, Component B was a polycarbodiimide emulsion (30% solids) prepared as described in US Patent Application Publication No. 2006/0094851 A1 as example PCD-2 on page 11. That reference is incorporated herein in its entirety by reference.

Preparation of Treatment Compositions and Application

In each of Examples 1-4 and C1, the treatment composition was made by mixing the following components in a beaker with constant stirring:

| | |
|---|---|
| 95.15 g | Deionized water, |
| 0.75 g | Propylene glycol, |
| 2.5 g | of the indicated Component A, |
| 1.6 g | Component B. |

The respective treatment composition were applied to swatches of each of four fabrics, as indicated, via spraying and heat activated by tumble drying each separately for 45 to 60 minutes in a domestic dryer on medium heat setting. The respective treatment compositions were found to provide the following water repellency results. Test methods and ratings are described in U.S. Patent Application Publication No. 2006/0094851.

| Example # | Fabric | WR | SR | Bundesmann 1 min. | 5 min. | 10 min. |
|---|---|---|---|---|---|---|
| 1 | polyester microfiber | 6 | 100 | 5 | 5 | 5 |
| | yellow polyester | 6 | 100 | 5 | 5 | 5 |
| | white polyester | 6 | 100 | 5 | 5 | 5 |
| | green nylon | 6 | 100 | 5 | 5 | 5 |
| 2 | polyester microfiber | 7 | 100 | 5 | 5 | 5 |
| | yellow polyester | 7.5 | 100 | 5 | 5 | 5 |
| | white polyester | 6 | 100 | 3.5 | 3 | 3 |
| | green nylon | 7.5 | 100 | 4 | 3.5 | 3 |
| 3 | polyester microfiber | 5 | 100 | 1 | 1 | 1 |
| | yellow polyester | 6 | 100 | 1 | 1 | 1 |
| | white polyester | 5 | 100 | 2 | 1.5 | 1 |
| | green nylon | 6 | 100 | 3 | 2 | 1.5 |
| 4 | polyester microfiber | 8 | 100 | 1.5 | 1 | 1 |
| | yellow polyester | 8 | 100 | 4 | 4 | 4 |
| | white polyester | 8 | 100 | 2.5 | 2 | 1.5 |
| | green nylon | 7 | 100 | 3.5 | 3.5 | 3.5 |
| C1 | polyester microfiber | 3 | 75 | — | — | — |
| | yellow polyester | 3 | 80 | — | — | — |
| | white polyester | 2.5 | 90 | — | — | — |
| | green nylon | 3 | 90 | — | — | — |

All four treatment compositions of the invention provided acceptable performance. Because of the poor SR performance of treatment composition C1, no Bundesmann tests were carried out on these samples.

As will be understood by those skilled in the art, variations and modifications to the foregoing may be used without departing from or exceeding the scope of the invention.

What is claimed is:

1. A method for imparting water repellency to a fabric substrate comprising (1) applying to a portion of the surface of said fabric substrate a treatment composition comprising an aqueous emulsion of a blend of (A) one or more fluorochemical esters and (B) one or more polycarbodiimides, and (2) drying said treatment composition at a temperature of about 50° C. to about 85° C. for about 45 to about 60 minutes; wherein said (A) fluorochemical ester is of the formula:

$$R^f-O-C(O)-R^1$$

wherein $R^f$ is selected from the group consisting of: (1) $F(CF_2)_x(CH_2)_m$ wherein x is from 4 to 20 and m is from 0 to 6; and (2) $F(CF_2)_xSO_2N(R^2)R^3$ wherein x is a positive integer from 4 to 20, $R^2$ is an alkyl radical of from 1 to 4 carbon atoms, and $R^3$ is an alkylene radical of from 1 to 12 carbon atoms; and $R^1$ is an aliphatic hydrocarbon having from 12 to 76 carbon atoms; wherein said treatment composition comprises from about 0.5 to about 2.5 parts by weight solids of said blend per 100 parts by weight and wherein the weight ratio of (A) to (B) is from about 25:75 to about 75:25.

2. The method of claim 1 wherein said weight ratio is about 60:40.

3. The method of claim 1 wherein said (A) fluorochemical ester is of the formula $$R^f-O-C(O)-R^1$$

wherein $R^f$ comprises $C_4F_9SO_2N(CH_3)CH_2CH_2-$ and $R^1$ is an alkyl containing 24 to 28 carbon atoms.

4. The method of claim 1 wherein said (B) polycarbodiimide is derived from a carbodiimidization reaction of at least one oligomer having at least one isocyanate group and comprising at least two repeating units deriving from one or more ethylenically unsaturated monomers.

5. The method of claim 4 wherein said carbodiimidization reaction further involves one or more isocyanate compounds other than said oligomer having at least one isocyanate group.

6. The method of claim 4 wherein said ethylenically unsaturated monomers correspond to the general formula:

$$R^hC(R)=CR_2$$

wherein $R^h$ represents H, Cl or a hydrocarbon group that may contain one or more catenary or non-catenary hetero-atoms and wherein each R being the same or different represents H, a lower alkyl of 1 to 4 carbon atoms, Cl, or Br.

7. The method of claim 4 wherein said oligomer corresponds to the formula:

$$G^1M^hG^2$$

wherein $M^h$ represents two or more repeating units deriving from one or more ethylenically unsaturated monomers, $G^1$ and $G^2$ each independently represents an end group and wherein at least one of said end groups comprises an isocyanate group.

8. The method of claim 7 wherein one of said end groups is free of isocyanate groups and wherein the other end group comprises 1 or 2 isocyanate groups.

9. The method of claim 4 wherein one or more of the carbodiimide compounds can be represented by the formula:

$$Q^1X^1CONH(A^1(N=C=N)_q)_mA^2NHCOX_2Q^2$$

wherein $X^1$ and $X^2$ each independently represents O, S, or NH, $A^1$ and $A^2$ each independently represents the residue of an organic di- or triisocyanate compound obtained by removing the isocyanate groups therefrom, q is 1 or 2, m has a value of 1 to 20, and $Q^1$ and $Q^2$, which may be the same or different, are selected from a hydrocarbon group that may contain one or more catenary or non-catenary hetero-atoms, a partially or fully fluorinated hydrocarbon group that may contain one or more catenary or non-catenary hetero-atoms and functional groups corresponding to any of the following formulas:

$$G^3M^hL^2- \tag{A}$$

$$Q^3X^3OCNHA^4((N=C=N)_tA^3)_sNHCOX^4L^3M^hG^4 \tag{B}$$

$$Q^3X^3OCNHA^4((N=C=N)_tA^3)_sNHCOX^4L^4- \tag{C}$$

$$G^4M^hL^2X^3OCNHA^4((N=C=N)_tA^3)_sNHCOX^4L^4- \tag{D}$$

$$G^4M^hL^2X^3OCNHA^4((N=C=N)_tA^3)_sNHCOX^4L^3M^hG^4 \tag{E}$$

wherein $G^3$ and $G^4$ each independently represents an end group, $M^h$ represents two or more repeating units deriving from one or more ethylenically unsaturated monomers, $L^2$ represents an organic divalent linking group, $Q^3$ represents a hydrocarbon group that may contain one or more catenary or non-catenary hetero-atoms or a partially or fully fluorinated hydrocarbon group that may contain one or more catenary or non-catenary hetero-atoms, $A^3$ and $A^4$ each independently represents the residue of an organic di- or triisocyanate compound obtained by removing the isocyanate groups therefrom, $X^3$ and $X^4$ each independently represents O, S, or NH, s has a value of 1 to 20 and t is 1 or 2, $L^3$ represents an organic trivalent linking group and $L^4$ represents a hydrocarbon group that may optionally contain one or more catenary or non-catenary hetero-atoms or a partially or fully fluorinated hydrocarbon group that may contain one or more catenary or non-catenary heteroatoms; and wherein at least one of $Q^1$ and $Q^2$ corresponds to a group of formula (A), (B), (D), or (E).

10. The method of claim 1 wherein said applying step comprises spraying.

11. The method of claim 1 where said drying step comprises tumble drying.

12. The method of claim 1 wherein said fabric substrate is a garment.

13. The method of claim 1 wherein said treatment composition further comprises one or more of the following: co-solvent, wetting agent, or fragrance.

14. A method for imparting water repellency to a fabric substrate comprising
   (1) applying to a portion of the surface of said fabric substrate a treatment composition comprising an aqueous emulsion of a blend of
      (A) one or more fluorochemical esters and
      (B) one or more polycarbodiimides, and
   (2) drying said treatment composition at a temperature of about 50° C. to about 85° C. for about 45 minutes to about 60 minutes; wherein said (A) fluorochemical ester is of the formula:

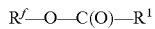

wherein $R^f$ is selected from the group consisting of: (1) $F(CF_2)_x(CH_2)_m$ wherein x is from 4 to 20 and m is from 0 to 6; and (2) $F(CF_2)_xSO_2N(R^2)R^3$ wherein x is a positive integer from 4 to 20, $R^2$ is an alkyl radical of from 1 to 4 carbon atoms, and $R^3$ is an alkylene radical of from 1 to 12 carbon atoms; and $R^1$ is a linear, saturated, aliphatic hydrocarbon having from 12 to 76 carbon atoms; wherein said treatment composition comprises from about 0.5 to about 2.5 parts by weight solids of said blend per 100 parts by weight and wherein the weight ratio of (A) to (B) is from about 25:75 to about 75:25.

* * * * *

UNITED STATES PATENT AND TRADEMARK OFFICE
CERTIFICATE OF CORRECTION

PATENT NO. : 8,821,984 B2
APPLICATION NO. : 12/209547
DATED : September 2, 2014
INVENTOR(S) : Chetan P. Jariwala It is certified that error appears in the above-identified patent and that said Letters Patent is hereby corrected as shown below:

In the Specification

Column 2

Line 47, delete "$R^1$is" and insert -- $R^1$ is --, therefor.

Column 5

Line 24, delete "di-t-butylperoxyphtalate," and insert -- di-t-butylperoxyphthalate, --, therefor.

Column 6

Line 1, delete "(oyalkylene)" and insert -- (oxyalkylene) --, therefor.

Column 6

Line 66, delete "polymethylenpolyphenylisocyanate" and insert -- polymethylenepolyphenylisocyanate --, therefor.

Column 9

Line 36 (approx.), delete "caternary" and insert -- catenary --, therefor.

Column 9

Lines 43-44 (approx.), delete "caternary" and insert -- catenary --, therefor.

Signed and Sealed this
Twenty-first Day of April, 2015

Michelle K. Lee
*Director of the United States Patent and Trademark Office*

Column 11

Lines 51-52, delete "perfluoralkyl" and insert -- perfluoroalkyl --, therefor.

Column 11

Line 55, delete "Milwakee," and insert -- Milwaukee, --, therefor.

In the Claims

Column 14

Line 3 (approx.), in Claim 6, delete "$R^hC(R)=CR_2$" and insert -- $R^hC(R)=CR^2$ --, therefor.